(12) United States Patent
Shen et al.

(10) Patent No.: US 11,537,522 B2
(45) Date of Patent: Dec. 27, 2022

(54) DETERMINING A TAG VALUE FOR USE IN A TAG-GUARDED MEMORY

(71) Applicant: Arm Limited, Cambridge (GB)

(72) Inventors: Xiaoyang Shen, Valbonne (FR); Yohann Fred Arifidy Rabefarihy, Antibes (FR); Cédric Denis Robert Airaud, Saint Laurent du Var (FR); Rémi Marius Teyssier, Le Bar sur loup (FR)

(73) Assignee: Arm Limited, Cambridge (GB)

( * ) Notice: Subject to any disclaimer, the term of this patent is extended or adjusted under 35 U.S.C. 154(b) by 638 days.

(21) Appl. No.: 16/521,665

(22) Filed: Jul. 25, 2019

(65) Prior Publication Data

US 2021/0026772 A1 Jan. 28, 2021

(51) Int. Cl.
*G06F 12/0875* (2016.01)
*G06F 9/30* (2018.01)
*G06F 12/0895* (2016.01)
*G06F 12/14* (2006.01)

(52) U.S. Cl.
CPC ...... *G06F 12/0875* (2013.01); *G06F 9/30029* (2013.01); *G06F 12/0895* (2013.01); *G06F 12/145* (2013.01)

(58) Field of Classification Search
CPC ............. G06F 12/0875; G06F 12/0895; G06F 12/145; G06F 9/30029
See application file for complete search history.

(56) References Cited

U.S. PATENT DOCUMENTS

2016/0371179 A1* 12/2016 Stark ................... G06F 11/1076
2020/0042725 A1* 2/2020 Bolkhovitin .......... H04L 67/108

* cited by examiner

*Primary Examiner* — Baboucarr Faal
(74) *Attorney, Agent, or Firm* — Nixon & Vanderhye P.C.

(57) ABSTRACT

An apparatus is provided for determining, for use in a tag-guarded memory, a selected tag value from a plurality of tag values. The apparatus comprises ordered list generation circuitry to receive an excluded tag vector comprising a plurality of fields, where each field is associated with a tag value and identifies whether the associated tag value is excluded from use. The ordered list generation circuitry is arranged to generate, from the excluded tag vector, an ordered list of non-excluded tag values. The apparatus further comprises count determination circuitry to determine, using the excluded tag vector and an identified start tag value, a count value indicative of a number of non-excluded tag values occurring in a region of the excluded tag vector bounded by an initial field and a field corresponding to the start tag value. The apparatus also comprises tag selection circuitry to determine the selected tag value from the ordered list based on the count value and an identified offset which indicates a required number of non-excluded tag values between the start tag value and the selected tag value.

18 Claims, 10 Drawing Sheets

| | | |
|---|---|---|
| Input | Exclude<br>Start tag<br>Offset | 1010 0110<br>↑<br>1010<br>2 |
| List generation | R<br>W<br>Looped R<br>Looped selection of exclude | [X...X, 110, 100, 011, 000]<br>4<br>[110, 100, 011, 000, 110, 100, 011, 000, 110, 100, 011, 000, 110, 100, 011, 000]<br>[000, 110, 100, 011, 000, 110, 100, 011] |
| Count determination | Mask<br>Mask OR Exclude<br>Count | 1111 1000<br>1111 1110<br>1 |
| Tag selection | Selected tag | 100 |

FIG. 8

DETERMINING A TAG VALUE FOR USE IN A TAG-GUARDED MEMORY

BACKGROUND

Technical Field

The present technique relates to the field of data processing. More particularly, the invention relates to determining tag values.

Technical Background

Some data processing systems make use of memory tagging to protect against memory usage errors. According to an example of such a scheme, blocks of one or more memory locations are provided with an associated guard tag that is stored in the memory system. When a memory access operation pursuant to the memory tagging scheme and specifying a target memory address is requested, an address tag associated with the target memory address is compared with the guard tag. Based on whether the address tag matches the guard tag, a determination can be made as to whether access to the memory location should be permitted. This approach can protect against accidental or malicious access to blocks of memory which could otherwise lead to unpredictable behaviour and potentially provide avenues for attackers to exploit.

Within a data processing system making use of such a memory tagging scheme, instructions may be issued that require a new tag value to be determined from among a set of possible tag values. There may also be provided a set of excluded tag values which are not to be selected for use, for example because those tag values have already been assigned. Accordingly, it may be desirable to provide an efficient way of determining a tag value for use in a tag-guarded memory while taking account of the set of excluded tag values.

SUMMARY

At least some examples provide an apparatus for determining, for use in a tag-guarded memory, a selected tag value from a plurality of tag values, comprising:

ordered list generation circuitry to receive an excluded tag vector comprising a plurality of fields, where each field is associated with a tag value in said plurality of tag values and identifies whether the associated tag value is excluded from use, the ordered list generation circuitry being arranged to generate, from said excluded tag vector, an ordered list of non-excluded tag values;

count determination circuitry to determine, using said excluded tag vector and an identified start tag value, a count value indicative of a number of non-excluded tag values occurring in a region of the excluded tag vector bounded by an initial field and a field corresponding to before said start tag value; and tag selection circuitry to determine the selected tag value from said ordered list based on said count value and an identified offset, the identified offset indicating a required number of non-excluded tag values between said start tag value and said selected tag value.

At least some examples provide a method for determining, for use in a tag-guarded memory, a selected tag value from a plurality of tag values, the method comprising:

receiving an excluded tag vector comprising a plurality of fields, where each field is associated with a tag value in said plurality of tag values and identifies whether the associated tag value is excluded from use;

employing ordered list generation circuitry to generate, from said excluded tag vector, an ordered list of non-excluded tag values;

employing count determination circuitry to determine, using said excluded tag vector and an identified start tag value, a count value indicative of a number of non-excluded tag values occurring in a region of the excluded tag vector bounded by an initial field and a field corresponding to said start tag value; and determining the selected tag value from said ordered list based on said count value and an identified offset, the identified offset indicating a required number of non-excluded tag values between said start tag value and said selected tag value.

Still further examples may provide an apparatus for determining, for use in a tag-guarded memory, a selected tag value from a plurality of tag values, comprising:

ordered list generation means for receiving an excluded tag vector comprising a plurality of fields, where each field is associated with a tag value in said plurality of tag values and identifies whether the associated tag value is excluded from use, the ordered list generation means for generating, from said excluded tag vector, an ordered list of non-excluded tag values;

count determination means for determining, using said excluded tag vector and an identified start tag value, a count value indicative of a number of non-excluded tag values occurring in a region of the excluded tag vector bounded by an initial field and a field corresponding to said start tag value; and tag selection means for determining the selected tag value from said ordered list based on said count value and an identified offset, the identified offset indicating a required number of non-excluded tag values between said start tag value and said selected tag value.

Further aspects, features, and advantages of the present technique will be apparent from the following description of examples, which is to be read in conjunction with the accompanying drawings.

BRIEF DESCRIPTION OF THE DRAWINGS

FIG. 8 is a worked example illustrating the operation of an apparatus for determining a selected tag value in accordance with one embodiment;

DESCRIPTION OF EXAMPLES

Figure 1:
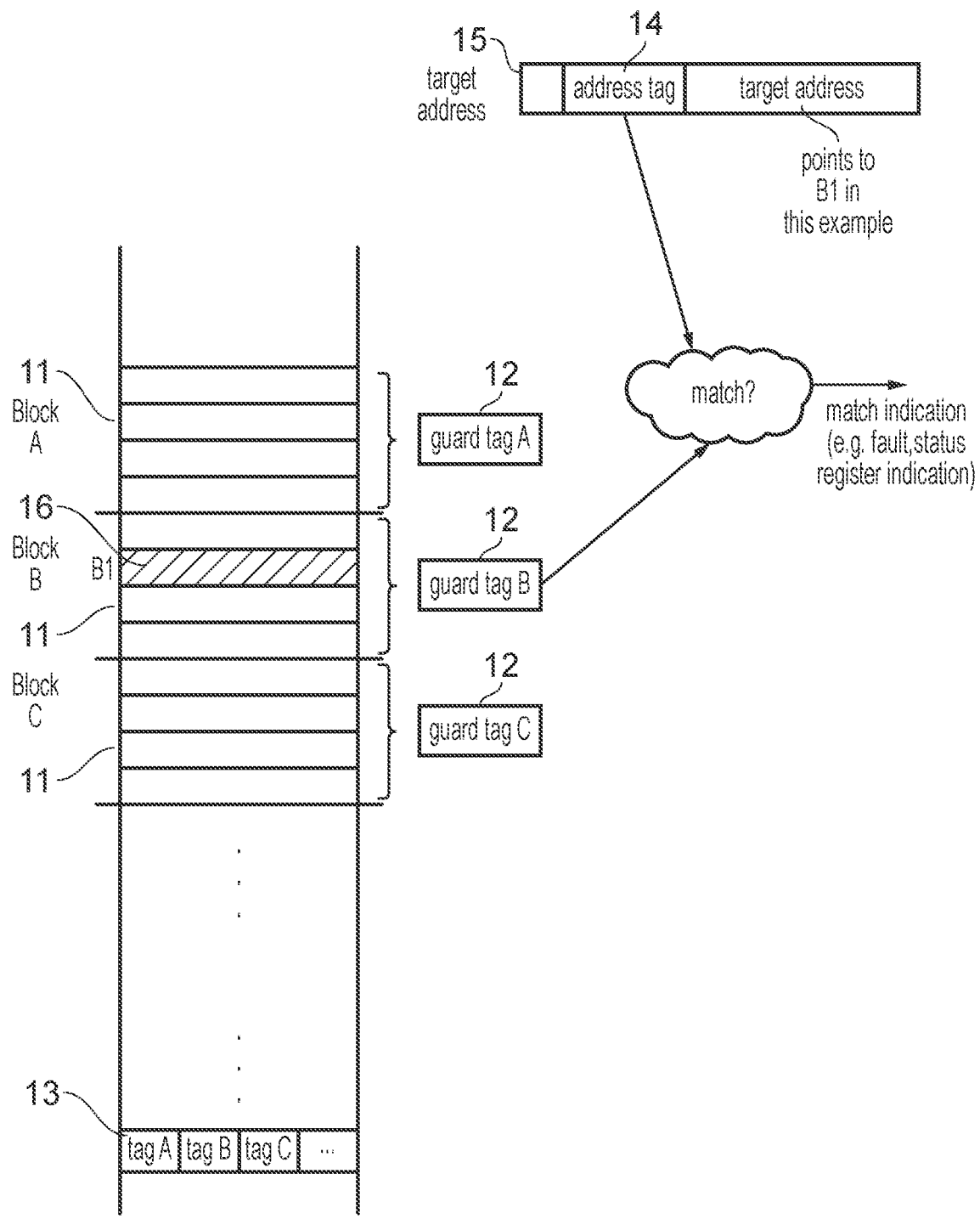
FIG. 1 shows an example of a tag-guarded memory access operation which incorporates checking whether an address tag matches a guard tag.

Some specific examples are described below. It will be appreciated that the invention is not limited to these exact examples.

Software to be executed by a data processing apparatus may typically be written in a high-level programming language and then compiled into code according to the instruction set architecture supported by the apparatus on which the software is to be executed. For example, the software may originally be written in a higher level language such as Java, C or C++, and then compiled into a natively supported instruction set architecture (ISA) such as x86 or Arm®.

Some higher level programming languages, such as Java, are considered memory-safe languages because they include run time error detection checks for checking for certain errors relating to memory accesses. In contrast, memory-unsafe languages, such as C and C++, do not include such run time error checks. The enduring prevalence of use of memory-unsafe languages means that in compiled code according to a given instruction set architecture, there may be a large number of memory related errors which may be vulnerable to exploitation by an attacker or other malicious party. Such errors may include:

Bounds violations, in which an array index supplied by the code is outside the legitimate bounds of the array;

Use-after-free errors, in which an access to a memory location is made after that memory location has already be deallocated or freed;

Use-after-return, in which a memory access to an address associated with a variable used within a function (such as a value on a stack) is made after already returning from the function;

Use-out-of-scope errors, in which variables are accessed outside of the scope in which they are declared; and Use-before-initialisation errors, in which a memory address associated with a variable is accessed before the variable has been initialised.

These are just some examples of memory-related errors which can result in unpredictable behaviour and potentially provide avenues for attackers to exploit.

One approach for protecting against certain memory usage errors of the type discussed above is to provide guard tags which are stored in a memory system in association with blocks of one or more memory locations. When a tag-guarded memory access operation is requested based on a target address identifying a particular addressed location in the memory system, memory access circuitry may compare an address tag that is associated with the target address with a guard tag that is stored in the memory system in associated with a block of one or more memory locations which includes the addressed location identified by the target address. The memory access circuitry may generate an indication of whether a match is detected between the guard tag and the address tag. This indication can be used to control whether the memory access is allowed to succeed or whether subsequent operations can succeed, or could merely be reported while allowing memory accesses to continue as normal.

This can be useful as, for example, a compiler compiling code based on a memory-unsafe language such as C or C++ can, when initialising regions of memory, set the guard tags of blocks of memory which the code is expected to access to particular values, and may associate the corresponding address tag values with the target addresses pointing to those blocks. If a memory usage error occurs, and for example the address pointer is used out of scope or extends out of the bounds of the valid range which was initialised, then it may be likely that the guard tag associated with the addressed location may not match the address tag associated with the target address, and then in this case the indication of whether a match is detected can be used to trigger some error handling response or error reporting mechanism. The particular response taken can depend on the particular needs of the software being executed or on the particular micro-architectural implementation of the architecture. Hence, even if the high level language does not have means for performing run time error checks in order to guard against memory access errors, the ISA used for the compiled code may include architectural features for performing such checks.

Some instructions defined by the ISA may require a new tag to be selected. For example, instructions that add or subtract values from an address may require a new tag to be generated for the new address based on the tag of the original address. Other instructions may require a new tag to be selected for use with a new address. It is desirable to have an efficient way of selecting new tags. In particular, by providing a technique for selecting new tags that has a latency lower than, or the same as, the latency for the add, subtract, or other operation that is being performed, the performance impact of implementing a tag-guarded approach can be masked behind the time required for processing the relevant instruction. For example, if a normal add operation has a latency of one clock cycle, then for an operation implementing an add and requiring selection of a new tag it is desirable to be able to select a new tag to be used with a timing cost of no more than one cycle. Consequently, this avoids the need to wait for a tag selection operation to finish which may otherwise lead to a loss of performance.

Tags in a tag-guarded memory are typically of a fixed-size, resulting in a fixed number of possible tag values. For example, a system may use 4-bit tags, for which there are 16 possible tag values. If a single tag value is used for several guard tags, this could result in a memory usage error whereby the address tag and guard tag have been associated with different blocks, but by virtue of sharing the same tag value, access to the memory location may be granted erroneously. In order to avoid this situation and provide protection against such memory usage errors, a record may be kept of tag values that have been already been used to prevent these being selected again. This record may indicate tag values that are otherwise reserved from use and so prevent these being selected. Thus when selecting a new tag, the present technique takes account of these excluded tag values to select a tag value that is not excluded.

The present technique makes use of this indication of excluded tag values as well as an identified start tag value and an offset value to select a non-excluded tag value separated from the start tag value by a number of non-excluded tag values indicated by the offset. In this way, the tag value to be selected can be identified quickly in a deterministic way while taking account of a tag value that may be associated with an input address and allowing control over which of the non-excluded tag values is to be selected by way of an offset.

In accordance with the techniques described herein, the indication of excluded tag values is implemented as an excluded tag vector. The excluded tag vector provides a plurality of fields, each field being associated with a particular possible tag value, and the field indicating whether that tag value is excluded from use. With this excluded tag vector, it is possible to determine for each possible tag value whether that tag value is eligible to be selected for use by examining the field associated with that tag value.

In accordance with the techniques described herein, a particularly efficient mechanism is provided for determining the selected tag value based on the excluded tag vector, the start tag value and the offset value.

In particular, ordered list generation circuitry is provided to receive such an excluded tag vector, and generate from it an ordered list of non-excluded tag values. That is, the ordered list generation circuitry can take the excluded tag vector and remove all of the excluded tags since these are not to be considered for selection. This is done ensuring that the resulting list is arranged in order of the tag values. This may be achieved where the excluded tag vector is already arranged in order of tag value with the ordered list being generated in such a way that the ordering of the excluded tag vector is preserved while the tag values corresponding to each field is determined and the non-excluded tag values are identified. In one example implementation such an ordered list can be generated solely from the excluded tag vector, without making use of the start tag value or the offset value at this stage. By generating this ordered list, the process of applying the offset from the start tag value to arrive at the selected tag value is made simpler, speeding up the determination of the tag value to use and reducing the likelihood of a stall as the processor waits for the tag value to be selected.

The start tag value may be identified in a variety of ways. For example, it could be the tag value associated with an address specified by the instruction that invokes the selection of a start tag value. According to such an implementation, the instruction may indicate a register storing an input address on which an operation such as an add or a subtract is to be performed. The tag value associated with that input address may be identified and used as the start tag value. The tag associated with the specified address may be stored alongside the address or may be stored in a dedicated portion of memory for associated tags. Alternatively, the start tag value may be provided directly to the apparatus performing the selection of a tag value. According to other implementations, the start tag value may also be identified from the excluded tag vector based on an indication of the field in the excluded tag vector that relates to the start tag value.

According to the present technique there is provided count determination circuitry to determine, using said excluded tag vector and an identified start tag value, a count value indicative of a number of non-excluded tag values occurring in a region of the excluded tag vector bounded by an initial field and a field corresponding to said start tag value. This count is performed so that the number of non-excluded tag vectors that occur in the specified region can be accounted for when selecting the tag to use as the ordered list is generated without taking into account the start tag value.

According to some example implementations, the excluded tag vector stores the fields associated with each tag value in order and the initial field is the first field in the excluded tag vector, corresponding to an initial tag value such as a zero value. This count may determine the number of non-excluded tag values that occur before the start tag value, also counting the start tag value if it is determined to be non-excluded. Thus an inclusive counting method can be adopted whereby the initial field and the field corresponding to the start tag value can be included in the count. Alternatively, implementations can be provided where one or both of these fields are not included in the count. The initial field may also be a field in the excluded tag vector other than the first field, indicating one bound of the region for which the count is to be obtained.

By adopting this approach of determining a count of the number of non-excluded tag values that occur in this range bounded at one end by a field corresponding to an identified start tag value, the operations of counting and of generating an ordered list can be parallelised. Since the ordered list generation can occur only based on the excluded tag vector (or optionally based on the excluded tag vector and the offset value as will be discussed later) and the count determination can occur based only on the excluded tag vector and the start tag value, at least parts of the these two operations may be performed at the same time which can improve the latency of the selection operation.

In accordance with the techniques described herein, the apparatus is also provided with tag selection circuitry to determine the selected tag value from the ordered list based on the count value and an identified offset indicating a required number of non-excluded tag values between the start tag value and the selected tag value. Thus, the tag selection circuitry uses the results of the ordered list generation circuitry and the count determination circuitry along with the offset to determine which tag value is to be selected. Since the ordered list of non-excluded tag values contains all of the non-excluded tag values identified from the excluded tag vector, the tag selection circuitry is configured to apply both the offset and the count of non-excluded tags occurring in a region bounded the initial field and the field corresponding to the start tag value when selecting the tag value for use.

According to some implementations, the offset can be applied to the ordered list to produce a modified ordered list indicative of both the non-excluded tag values and the offset that is to be applied. For example, the offset may be applied to the ordered list to produce a modified list that starts with a tag value separated from the initial tag value in the original ordered list by an amount dictated by the offset. According to such implementations, the count value can then be applied to take account of the identified start tag value by selecting a tag value corresponding to a position in the modified list given by the count value. By applying the offset to the ordered list in a separate operation to applying the count value, the overall performance of the selection of a tag value may be improved since, if the ordered list is generated before the count is determined, the apparatus does not have to wait for the count value to be determined before the offset, which may already have been identified, is applied.

The region of the excluded tag vector bounded by an initial field and a field corresponding to the start tag value may be defined according to a number of different schemes. According to some implementations, the region does not include either of the initial field or the field corresponding to the start tag value. According to some other implementations, however, the region is defined inclusively and includes one or both of the initial field and the field corresponding to the start tag value. By including the field corresponding to the start tag value in the region of the excluded tag vector, the apparatus may take account of whether the start tag value itself is designated as excluded or non-excluded in the excluded tag vector. According to some implementations, the excluded tag vector's fields are in order of the tag value and the initial field is the first field in the excluded tag vector, corresponding to an initial tag value.

The ordered list generation circuitry may be configured to generate an ordered sequence of non-excluded tag values. This sequence may comprise a sequence of all of the non-excluded tag values as determined from the excluded tag vector. The length of this sequence may be dependent on the number of non-excluded tag vectors. However, in some implementations, the ordered list of non-excluded tag values is to be of a predetermined length. This predetermined length will generally need to be at least as long as the number of possible tag values as it could be the case that none of the tag values are excluded and so the ordered list of non-excluded tag values will need to be able to store all of the possible tag values. In situations where the sequence of non-excluded tag vectors is shorter than a length required for the ordered list, to fully populate the ordered list the ordered list may be generated as a looped list and a repeated portion of the sequence is added. So if the ordered list is to have P elements, the looped list is completed by adding at least a repeated portion of the ordered sequence of non-excluded tag values so as to pad the ordered list to contain P elements. For example, if the sequence of non-excluded tag values contains P/3 elements, the ordered list may be padded with another two iterations of the ordered sequence to result in a total of three iterations of the ordered sequence in the ordered list. In cases where the ordered list has a length P that is not a multiple of the number of elements in the sequence, a repeated portion of the sequence may be used to achieve the length P. So, if the ordered list has a predetermined length P, where P equals eight, and the sequence of non-excluded tag values comprises five tag values, the ordered list is completed by adding a repeated portion comprising the first three tag values of the sequence.

By adopting the approach of padding the ordered list with a repeated portion of the sequence, the apparatus can make use of an ordered list that is known to be of a predetermined size which can improve the predictability of the memory usage of the tag selection procedure. Further by having a fixed size of ordered list, the tag selection circuitry can be simplified since it does not need to be capable of determining and handling an ordered list that may vary in size with the number of non-excluded tag values.

For certain values of the identified offset and the determined count value, when applied to the ordered list, the offset and count value may indicate a tag value beyond the range of the determined sequence of non-excluded tag values. In this situation, according to some implementations, the apparatus is configured to determine as the selected tag value, a tag value that results from counting around the sequence a further one or more times. By using as the padding for the ordered list, at least a repeated portion of the ordered sequence of non-excluded tag values, the implementation of this behaviour can be simplified, leading to improved tag selection performance. This occurs since, instead of having to identify when the end of the sequence has been reached when applying the offset and count value, the tag selection can be configured to keep counting through the looped ordered list.

According to some implementations, the length P of the ordered list is equal to the sum of the maximum value of the start tag value and the maximum value of the offset. Using an ordered list of this length reduces the need to handle looping around the ordered list when the count value and offset are applied. For lengths of ordered list shorter than the sum of the maximum start tag value and the maximum offset, it is possible that when the count value and offset are applied, the tag selection circuitry will receive a count value and offset that are sufficiently large that counting through the ordered list has to return to repeat from the beginning of the ordered list. However, the inventors recognised that the maximum total count required for selection into the ordered list occurs when the offset takes its maximum value and where the start tag has a maximum value and all of the tag values are indicated as being non-excluded. Thus, by providing an ordered list comprising a looped list as explained above, the tag selection circuitry does not need to be able to handle the looping functionality itself, simplifying the tag selection circuitry required and resulting in quicker tag value selection.

In some implementations, the tag selection circuitry is configured to count directly into the ordered list by an amount given by the sum of the offset and the count value. According to some implementations however, the ordered list generation circuitry is arranged to produce a modified ordered list by selectively reducing the number of elements in the ordered list based on the offset, and the tag selection circuitry is arranged to determine as the selected tag value, the tag value at a position in the modified ordered list determined by the count value. Since the offset may be known before the count value is determined, the ordered list generation circuitry may be configured to apply this information to the ordered list before the count determination circuitry has finished executing so as to reduce the amount of processing needed to be performed by the tag selection circuitry and consequently determine a selected tag value for use more quickly. According to such implementations, the ordered list generation may be configured to generate the modified ordered list such that the first element of the modified list corresponds to an element in the ordered list given by the offset. That is, the modified ordered list may be generated from the ordered list, starting from a tag value that is offset from the initial tag value of the ordered list.

In some cases, the modified ordered list is produced having fewer elements than the ordered list. As discussed above, the ordered list may be produced with a number of elements P equal to the sum of a maximum start tag value and a maximum offset. Since, when producing the modified ordered list, the offset has been applied, the modified ordered list may have a number of elements equal to the maximum start tag value. This is because, once the offset has already been applied in producing the modified ordered list, it is known that the maximum start tag value represents the maximum value of the modified ordered list that may be required for selection without the tag selection circuitry having to implement the looping. Thus a smaller modified ordered list can be generated for determining a selected tag value using the determined count value.

The excluded tag vector can take a variety of forms but in one example arrangement may be implemented as a bit vector such that each field comprises a single bit, with the index of each bit in the bit vector being used by the ordered list generation circuitry to determine the tag value to which that bit relates. So for a 4-bit tag vector, the excluded tag vector may comprise a 16-bit bit vector with each bit indicative of whether the corresponding tag value is excluded or non-excluded. For example, a 0 in the bit vector may indicate that the tag value is available, and a 1 may indicate that the tag value is excluded from use. Moreover, for example, the bit relating to the tag value of 0000 may be at index 0 of the bit vector. Likewise, the bit of the bit vector corresponding to the tag value of 0101 may be at index position 5 (where 0101 is the binary representation of 5). In this way, conversion between the field in the excluded tag vector and the relevant tag value may be performed quickly compared with an excluded tag vector that stores information in other way such as by storing pairs of tag value and excluded information or storing the information relating to excluded tag vector in an order other than the order of tag values. Using a bit vector, and relating the fields to the tag values through the index, also results in an excluded tag vector that occupies less space.

The count determination may be implemented in various way but according to some implementations, the count determination circuitry makes use of a mask to determine the count value. The count determination circuitry may be arranged to generate a mask that indicates the field in the excluded tag vector corresponding to the start tag value. This could for example be done by generating a mask comprising the same number of bits as the number of fields in the excluded tag vector, with the bits at one end of the mask set to 0, the bits at the other end of the mask set to 1, and the point at which the bits in the mask change from a 0 to a 1 indicating the field in the excluded tag vector corresponding to the start tag value. For example, the bit of the mask corresponding to the field in the excluded tag vector representing the start tag value may be set to 0 with less significant bits of the mask also 0, and more significant bits set to 1.

The count determination circuitry may be arranged to then perform a logical operation on the mask and the excluded tag vector to produce a masked excluded tag vector. This masked excluded tag vector can indicate the non-excluded tag values occurring in the region bounded by the initial field and the field corresponding to the start tag value. With the mask described above, by performing a logical OR operation between the mask and an excluded tag vector represented as a bit vector, the bits more significant than the start tag value are set to 1, with the bit corresponding to the start tag value and the less significant bits retaining the value they held in the excluded tag vector.

In order to determine the count value, the count determination circuitry may next count the number of fields in the masked excluded tag vector having a predetermined value. For example, if a 0 in the bit vector is indicative of a non-excluded tag value, the number of 0s in the masked excluded tag vector may be counted, with the result being indicative of the number of non-excluded tags in the region bounded by the initial field, which may be the first field in the excluded tag vector, and a field corresponding to the start tag value.

This approach provides an efficient way of determining the count by making use of bitwise logical operations which can often be performed very quickly.

The counting of the number of fields in the masked excluded tag vector having a predetermined value may be done according to a number of methods. For example, the count could be performed using a binary tree adder or using carry-save adder reduction. To reduce the complexity of the count determination circuitry, logic already existing in a data path where the instruction is to be carried out could be used and so the method of counting may be determined by the specific logic provided there.

There are a number of ways of implementing the ordered list generation circuitry. According to some implementations, the ordered list generation circuitry comprises a plurality of modules arranged to form nodes of a binary tree. Certain modules can be considered leaf nodes if they have no other modules as children providing input to them. Modules forming nodes other than leaf nodes may receive their input as the output of multiple child nodes, and the output of such modules may form the input of a parent module. In this way, the modules can operate in combination to build up the ordered list of non-excluded tags recursively, such that each node other than a leaf node is arranged to operate on intermediate results produced by connected child nodes. The leaf nodes may be arranged to each operate on a portion of the excluded tag vector, producing an intermediate result to pass to a module forming a parent node so at each level of the binary tree, the modules are operating on results corresponding to larger portions of the excluded tag vector than the modules forming its child nodes. In this way, an ordered list may be built up recursively with each module receiving intermediate results corresponding to multiple (e.g. two) portions of the excluded tag vector, combining them to produce an intermediate result corresponding to a combined portion of the excluded tag vector and providing this to a parent module.

In one example arrangement, modules forming a node other than a leaf node may be arranged to receive intermediate ordered lists from two child nodes. One of these child nodes may correspond to a high portion of the non-excluded tag vector, i.e. a more significant part of the excluded tag vector than a low portion to which the other child node corresponds. Each of the child nodes may also pass a count of a number of non-excluded tag values in the respective intermediate ordered list to the module. The module forming a node other than a leaf node may then operate on these two intermediate ordered lists using the two counts to produce an ordered list of non-excluded tag values and a count of a number of non-excluded tag values in a portion of the non-excluded tag vector corresponding to the combination of the high and low portions. For example, the root node (the node having no parent nodes) may receive from its two child nodes, intermediate ordered lists corresponding to the two halves of the excluded tag vector, and a count of non-excluded tag values for each of the intermediate ordered lists. The root node may be arranged to produce, based on this, an ordered list of the non-excluded tag values corresponding to the whole excluded tag vector and output a count, determined as the sum of the two counts received from the child nodes. In this way, the ordered list and the count of the number of non-excluded tag values corresponding to the entire excluded tag vector can be built up in stages based on the results of portions of the excluded tag vector.

In order to carry out the above-described operation of the modules forming nodes other than leaf nodes, each module may be arranged to adjust the values of the elements of the high intermediate ordered list and the low intermediate ordered list to account for a size of the portion of the excluded tag vector being processed by that module. In some implementations this involves prepending a 0 to the start of the tag values from the low intermediate ordered list and prepending a 1 to the start of the tag values from the high intermediate ordered list. In this way, the relative significance of the tag values from the two intermediate ordered lists may be accounted for, and by performing this operation at each module, each tag value can be built up bit-by-bit as it is processed by each module.

Having adjusted the value of the elements of the high and low intermediate ordered lists, the adjusted high intermediate ordered list is right-shifted by a number of bits indicated by the count of the number of non-excluded tag values in the low intermediate ordered list. The number of bits by which to right-shift may be equal to the count of a number of non-excluded tag values in the low intermediate ordered list. The ordered list can then be produced by propagating the right-shifted adjusted high intermediate ordered list and any part of the adjusted low intermediate ordered list that does not overlap with the right-shifted intermediate ordered list. Since the list containing tag values from the more significant portion of the excluded tag vector has been right-shifted by a number of non-excluded tag values in the list containing tag values from the less significant portion, when the ordered list is produced, the non-excluded tag values from the low intermediate ordered list will be preserved since the right-shifted high intermediate ordered list will not overlap with those values. The values from the high intermediate ordered list will be propagated in a more significant position of the resulting ordered list, maintaining the ordering of the non-excluded tag values and resulting in an ordered list of non-excluded tag values corresponding to the aggregated portions of the excluded tag vector being processed by that module. Bit-shifting and bit-forwarding operations as used in this process can typically be performed quickly as compared with other types of operations, and as such the above described method can provide an efficient way of generating the ordered list.

According to the described implementations, modules forming nodes that are not leaf nodes operate in response to ordered lists produced by their child nodes. However, leaf nodes do not have any child nodes and instead may operate on a portion of the excluded tag vector directly. For example, each leaf node may receive two fields of the excluded tag vector, which may be two bits of a bit vector, and output an ordered list based on the combination of these two fields and a count of the number of non-excluded tag values in the ordered list. For example, if both of the fields were determined to correspond to non-excluded tag values, the module forming the leaf node may be arranged to output an indication of the two tag values in order and return a count value of two. Thus the leaf nodes can operate in a similar way to the modules forming nodes other than leaf nodes, allowing for easier implementation of the required logic.

A new tag value may need to be selected in a number of scenarios. For instance, an instruction may be executed which indicates that a new tag is needed. According to some implementations, the instruction may indicate that an operation is to be performed specifically according to a memory-tagging scheme. The instruction may be a variant of a standard instruction that does not indicate that tags have to be considered, with the variant being a variant for a tag-guarded memory, indicating that in this case a new tag is to be generated in addition to performing the operation of the corresponding standard instruction. The apparatus may therefore be arranged to operate in response to such an instruction, with the instruction identifying the start tag value and the offset. The instruction may identify the start tag value in a number of ways, for example directly as an immediate value, or by indicating in the instruction a register storing the start tag value (or a memory address with which the start tag value is associated). Similarly, the offset may be identified directly in the instruction as an immediate value, or the instruction may indicate a register storing the offset, for example.

When implementing a tag-guarded memory, if an operation associated with handling a tag takes longer than the operation to which the tag handling operation is related, the system may perform slower by virtue of implementing the memory tagging scheme. It is desirable therefore to hide the time required for handling tags behind the operations that are to be processed even if the memory tagging scheme were not being implemented. Therefore, in response to an instruction that specifies a manipulation to perform on an identified address value, the apparatus may be arranged to determine the selected tag value in a same number of clock cycles taken to perform the manipulation on the identified address value. By determining the selected tag value within a same number of clock cycles as is required for performing the manipulation specified by the instruction, the likelihood of a stall occurring while waiting for a tag to be selected is reduced, consequently allowing memory security to be improved while reducing the associated impact on performance.

According to some implementations, the excluded tag vector is stored in a control register (for example a system register) and updated when a tag value is determined to be freed for use or excluded from use. The apparatus is therefore arranged to receive the excluded tag vector from the control register. As a result of selecting the new tag, that tag may be marked as excluded since it is now in use and the apparatus may be configured to indicate that the excluded tag vector is to be updated to represent this information.

Specific examples will now be described with reference to the figures.

FIG. 1 schematically illustrates a concept of tag-guarded memory accesses. The physical address space used to refer to memory locations within the memory system may be logically partitioned into a number of blocks 11 each comprising a certain number of addressable locations. For conciseness, in the example of FIG. 1, each block 11 comprises four memory locations, but other block sizes could be used as well. Each block 11 is associated with a corresponding guard tag 12. The guard tags associated with a certain number of blocks 11 can be gathered together and stored either within a different architecturally accessible memory location 13 within the physical address space, or within additional storage locations provided in main memory which are not architecturally accessible (not mapped to the same physical address space). The use of separate non-architecturally accessible storage may in some cases be preferred to avoid using up space in data caches for caching guard tag values, which could impact on the performance of the regular code and could make coherency management more complex. An additional tag cache could be provided in the micro architecture for caching tag values from the non-architecturally accessible storage, for faster access than if the tags had to be accessed from main memory. The particular mapping of which tag storage locations 13 correspond to each block 11 may be controlled by a load/store unit and could be hardwired or could be programmable. While in FIG. 1 each tag 12 is associated with a block of physical addresses, it would also be possible to provide guard tags 12 associated with virtual memory locations in a virtual memory address space, but this may require some additional address translations on each memory access. Hence by associating the guard tag 12 with physical memory locations this can improve performance. In general it is a choice for the particular micro architectural implementation exactly how the guard tags 12 are associated with the corresponding blocks 11 of the physical address space. In general, all that is required is that the guard tag 12 associated with a given block of memory can be accessed and compared.

Hence, when a tag-guarded memory access is required, an address tag 14 (which is associated with the target address 15 identifying the addressed location 16 to be accessed), is compared against the guard tag 12 which is associated with the block of memory locations 11 which includes the addressed location 16. For example, in FIG. 1 the target address 15 points to a certain location B1 in memory, marked 16 in the address space of FIG. 1. Therefore the guard tag B which is associated with the block of locations B including location B1 is compared against the address tag 14 associated with a target address 15. The address tag 14 and guard tag 12 can be a relatively small number of bits, e.g. 4 bits, and so need not occupy much space within the memory and within the target address. Providing 4 bits of tag space, i.e. 16 possible values of the tags, can often be enough to detect many common types of memory access errors.

Hence, when a tag-guarded memory access is performed, the load/store unit compares the address tag 14 and the guard tag 12 associated with a block 11 including the addressed location 16, and determines whether they match. The load/store unit generates a match indication indicating whether the address tag 14 and the guard tag 12 matched. For example, this match indication could be a fault signal which is generated if there is a mismatch between the address tag 14 and the guard tag 12, or an indication placed in a status register indicating whether there was a match, or an entry added to an error report to indicate the address for which the error was detected and/or the instruction address of the instruction which triggered the error.

Figure 2:
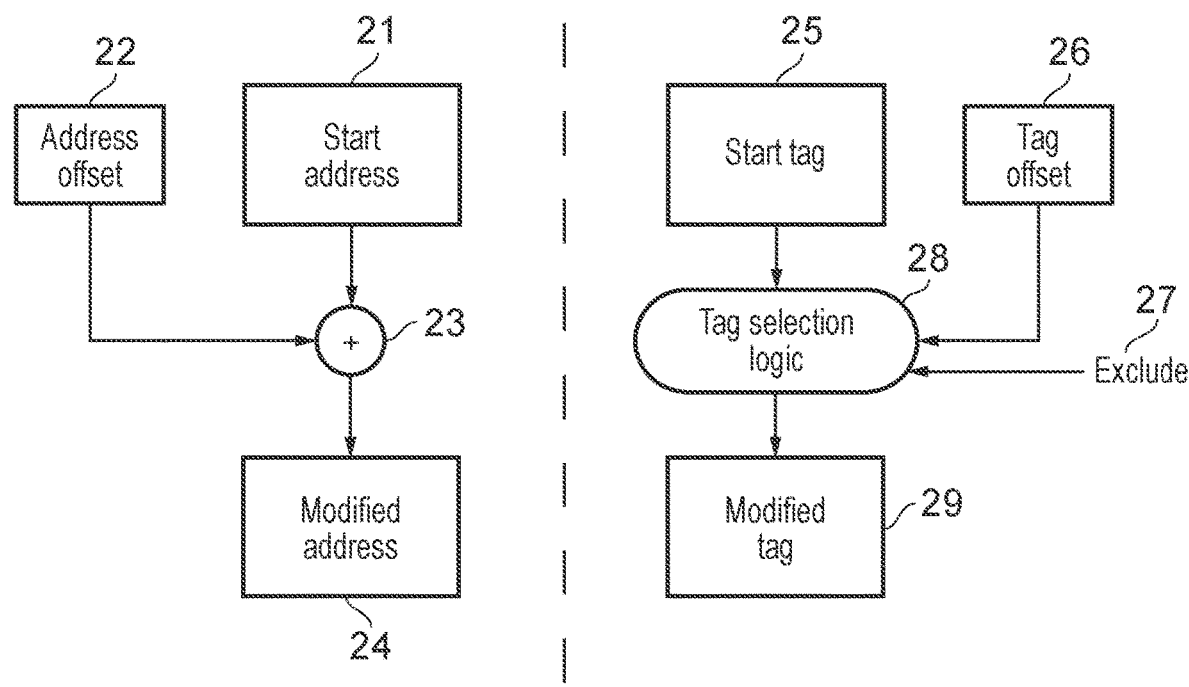
FIG. 2 schematically illustrates an operation being performed on an address and a corresponding operation being performed to determine a selected tag value in accordance with one example implementation.

FIG. 2 schematically illustrates an operation 23 being performed on an address 21 and a corresponding operation being performed to determine a selected tag value 29. In this case, the operation 23 is an add operation. The operation 23 is initiated in response to an instruction specifying the operation to be performed, a source register at which a start address 21 is stored, and an address offset 22. The address offset 22 is added to the start address 21 to produce a modified address 24 which is stored to a destination register indicated by the instruction. The instruction also indicates that the add is to be performed according to a memory-tagging scheme and indicates a tag offset 26. Tag selection circuitry referred to as tag selection logic 28 is arranged to identify a start tag 25 associated with the start address 21 and an excluded tag vector 27 that is stored in a control register (eg a system register). The tag selection circuitry 28 is configured to determine, from these inputs, a modified tag 29 to be associated with the calculated modified address 24. According to this example, both the add operation 23 and the tag selection operation performed by the tag selection logic 28 are performed with a latency of one clock cycle. Thus, when the two operations are performed, the processor does not need to wait for the tag selection operation to finish after the add operation 23 has occurred. Therefore, the tag selection operation does not impact the performance of the add operation 23.

Pseudocode indicating the operation of an ADDG or a SUBG (an add with tag or a subtract with tag) instruction is set out below. The instruction indicates a start address 21 and an address offset 22, operands 1 and 2, and a tag offset 26, tag_offset. The excluded tag vector 27 is stored in a control register and referred to as GCR_EL1.Exclude. The pseudocode illustrates the add or subtract operation being performed and a tag value 29, rtag, being generated to be associated with the resulting address 24:

```
    bits (64) operand1 = if n == 31 then SP[ ] else X[n];
    bits(4) start_tag = AllocationTagFromAddress(operand1);
    bits(64) result;
    bits(4) rtag;
    if AllocationTagAccessIsEnabled( ) then
```

```
        rtag = ChooseNonExcludedTag(start tag, tag offset,
    GCR_EL1.Exclude);
    else
        rtag = '0000';
    if add then
        (result, -) = AddWithCarry(operand1, offset, '0');
    else
        (result, -) = AddWithCarry(operand1, NOT(offset), '1');
    result = AddressWithAllocationTag(result, rtag);
    if d == 31 then
        SP[ ] = result;
    else
        X[d] = result;
```

The operation of ChooseNonExcludedTag to select a new tag for use is set out in the following pseudocode:

```
    bits(4) ChooseNonExcludedTag(bits(4) tag, bits(4) offset,
bits(16) exclude)
        if exclude == Ones(16) then
            return '0000';
        if offset == '0000' then
            while exclude<UInt(tag)> == '1' do
                tag = tag + '0001';
        while offset != '0000' do
            offset = offset - '0001';
            tag = tag + '0001';
            while exclude<UInt(tag)> == '1' do
                tag = tag + '0001';
        return tag;
```

The tag selection logic 28 of FIG. 2 is used to implement the functionality of ChooseNonExcludedTag in an efficient manner, and this functionality will be discussed in more detail with reference to the remaining figures.

Figure 3:
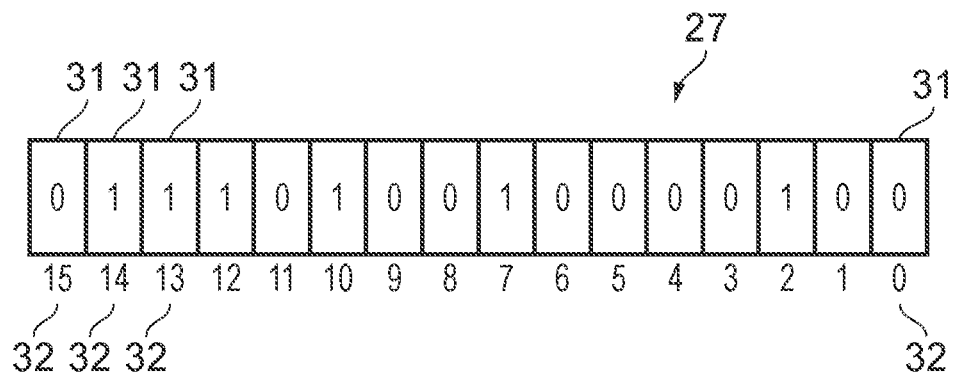
FIG. 3 illustrates the structure of an excluded tag vector where the excluded tag vector is a bit vector in accordance with one example implementation.

FIG. 3 illustrates the structure of an excluded tag vector 27. According to the implementation shown in FIG. 3, the excluded tag vector 27 is a bit vector. Each field 31 of the bit vector 27 comprises a single bit to indicate whether a particular tag value is available for use or not. A bit value of 1 indicates the corresponding tag value is excluded and a bit value of 0 indicates the corresponding tag value is not excluded (i.e. is available). Whether a tag value is available is indicated in the table at the bottom of the figure. The fields 31 of the excluded tag vector 27 are arranged in order so that the index 32 of a field 31 in the excluded tag vector 27 gives the tag value to which it relates. For example, the field 31 at index 13 32 stores a value of 1. This indicates that tag value 1101 is excluded, where 1101 is a binary representation of the decimal number 13. Hence, the tag value can be determined from an index 32 and the index 32 determined from a tag value.

Figure 4:
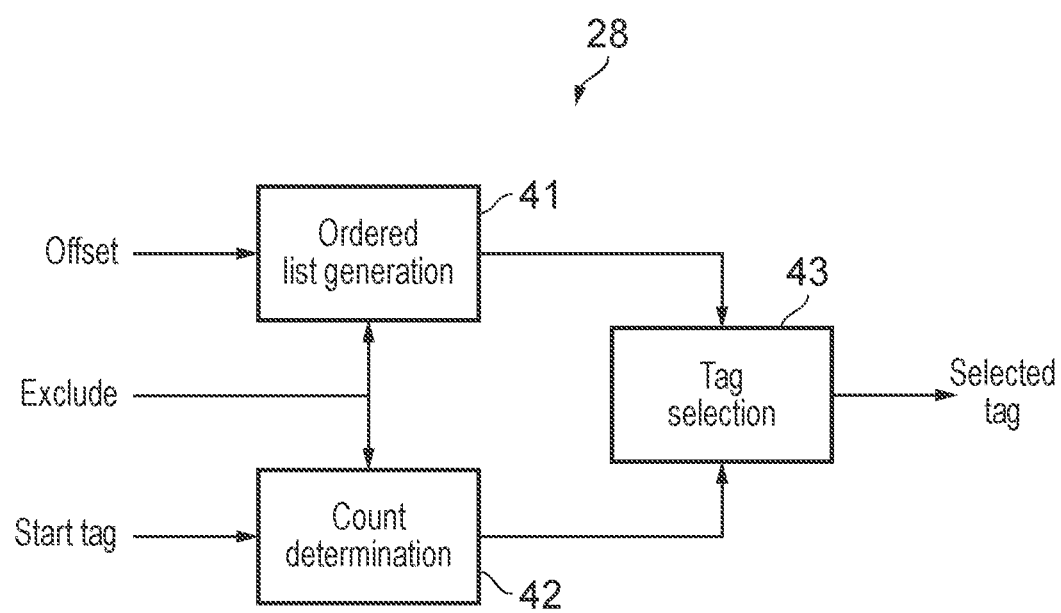
FIG. 4 schematically illustrates an apparatus for determining a selected tag value in accordance with one example implementation.

FIG. 4 schematically illustrates an apparatus 28 for determining a selected tag value. The apparatus 28 comprises ordered list generation circuitry 41, count determination circuitry 42 and tag selection circuitry 43. Although the circuitry elements 41, 42, 43 are depicted as three separate elements, the functionality of each of these elements may be performed at different locations or the circuitry elements may be arranged differently to the arrangement shown in FIG. 4. According to the implementation depicted in FIG. 4, the ordered list generation circuitry 41 is arranged to receive an offset specified in an instruction and an indication of the excluded tag values as stored in a control register. Based on this information, the ordered list generation circuitry 41 produces an ordered list of non-excluded tag values which is passed to the tag selection circuitry 43. The count determination circuitry 42 is arranged to receive the start tag associated with the address stored in the source register indicated by the instruction. Based on the start tag value and the excluded tag vector, the count determination circuitry 42 identifies the number of non-excluded tag values occurring in a region encompassing the start tag value and the tag values occurring before the start tag value. According to other implementations, the region for which the count is determined may differ by virtue of not including the start tag value in the count or by using an initial field from which to start the count that does not correspond to the first tag value. Having determined this count value, the count value is passed to the tag selection circuitry 43. The tag selection circuitry 43, in response to the ordered list and the count value, is arranged to select as the selected tag value, a tag value offset from the start tag value by a number of non-excluded tag values given by the offset. That is, the tag selection circuitry, counts on from the first non-excluded tag in the ordered list (which may be the start tag value) by a number of non-excluded tag values equal to the offset. The resulting tag value is then determined to be the selected tag value and returned as the result of the tag selection operation.

Figure 5:
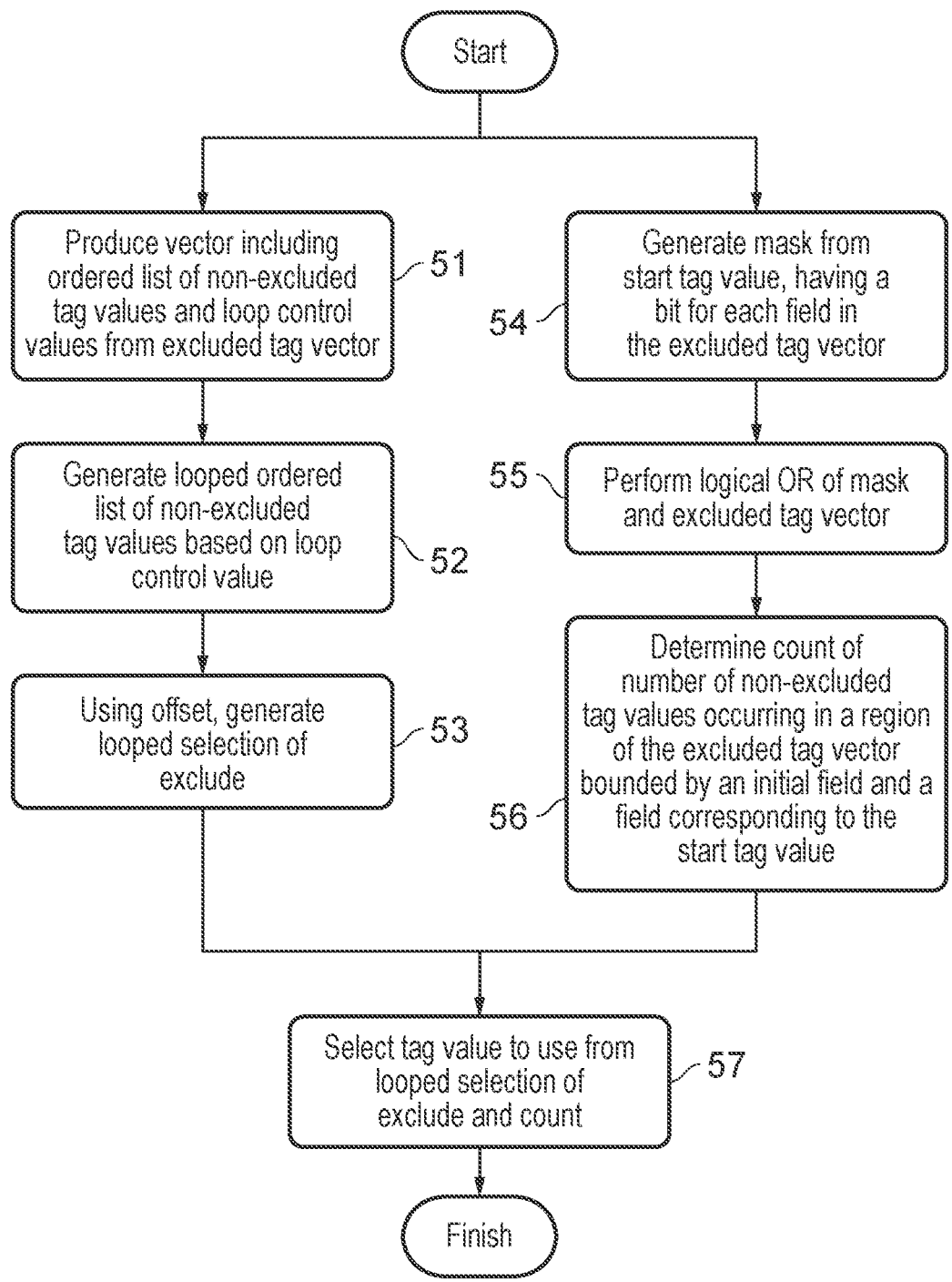
FIG. 5 is a flowchart illustrating the operation of an apparatus for determining a selected tag value in accordance with one example implementation.

FIG. 5 is a flowchart illustrating the operation of the apparatus 28 for determining a selected tag value. By reference to FIG. 4, steps 51 to 53 of FIG. 5 are performed at the ordered list generation circuitry 41, steps 54 to 56 are performed at the count determination circuitry 42, and step 57 is performed at the tag selection circuitry 43. At step 51, the ordered list generation circuitry 41 produces from the excluded tag vector a vector comprising an ordered list of non-excluded tag values, and a loop control value. The loop control value indicates the number of non-excluded tag values. The production of this ordered list and the loop control value is explained further below with reference to FIGS. 6 to 10. At step 52, the ordered list and loop control value are used to generate a looped ordered list of non-excluded tag values. According to this implementation, the number of elements of the ordered list is predetermined. Therefore, where the number of non-excluded tag values is sufficiently low that the ordered list to be passed to the tag selection circuitry is not filled simply by populating it with one sequence of the non-excluded tag values, the ordered list is padded by repeating the sequence of non-excluded tag values until the ordered list is filled. The loop control value indicates the number of non-excluded tag values that are in the sequence and is used to determine, of the elements present in the vector including the ordered list, which of these elements relate to non-excluded tag values, and so which of these are tag values to be looped. Based on the looped ordered list and the offset, at step 53 a looped selection of exclude is produced. The looped selection of exclude is generated by selecting from the looped ordered list of non-excluded tag values, a series of non-excluded tag values, starting from a position in the looped ordered list given by the offset and having a length equal to the maximum value of the start tag value. By doing this, when the tag selection circuitry comes to determine the selected tag value from the looped selection of exclude, the tag selection circuitry does not have to handle any looping itself which it otherwise might if the tag to select lies outside of a sequence of non-excluded tag values that has not been looped. Functionality to handle looping at the tag selection circuitry is therefore not needed while using the minimum length for the looped selection of exclude to save space in memory.

At step 54, the count determination circuitry 42 is arranged to generate, from the start tag value, a mask with a bit for each field in the excluded tag vector. According to the described implementation, the mask is generated comprising a 0-bit at the bit position corresponding to the start tag value, 0s for less significant bits than the start tag value, and 1s for more significant bits than the start tag value. According to other implementations, the mask may be generated differently while still indicating the location of the start tag value. At step 55 this mask is combined with the excluded tag vector (which is a bit vector) using a bitwise OR operation. Doing this, all of the bits of the resulting masked excluded tag vector more significant than the start tag value have a value of 1 with the bit corresponding to the start tag value and less significant bits having a value of 0 if the corresponding tag is available and 1 if the corresponding tag is not available. Thus at step 56, the count of a number of non-excluded tag values occurring before the start tag value in the excluded tag vector can be determined by counting the number of 0s in the masked excluded tag vector. According to this implementation, the count is performed using a carry-save adder reduction as an efficient way to count the number of 0s.

Pseudocode for generating the mask is shown below:

Mask[$n$]=if ($n$<=UINT(start tag)) 1'$b$1; else 1'$b$0;

The tag selection circuitry 43 is then configured to select from the looped selection of exclude, a tag value to use at step 57 using the count value. Since the offset has already been applied, the tag selection circuitry 43 only needs to apply the determined count value to account for whether the start tag value is excluded and the number of non-excluded tag values before the start tag value. To determine the selected tag value, the tag selection circuitry 43 is arranged to select the tag value that corresponds to the position in the looped selection of exclude given by the count value. The tag selection circuitry 43 does not have to handle any looping since the length of the looped selection of exclude is equal to the maximum possible value of the count value and already contains repeated portions of a single sequence of the non-excluded tag values. This selected tag value is then returned by the apparatus 28 to be associated with the modified address 24 produced by the operation indicated by the instruction being executed.

Steps 51 to 53 and steps 54 to 56 are performed in parallel according to this implementation, allowing the process to be carried out efficiently since the ordered list generation and the count determination do not require each other to have finished to be able to carry out their operation.

Figure 6A:
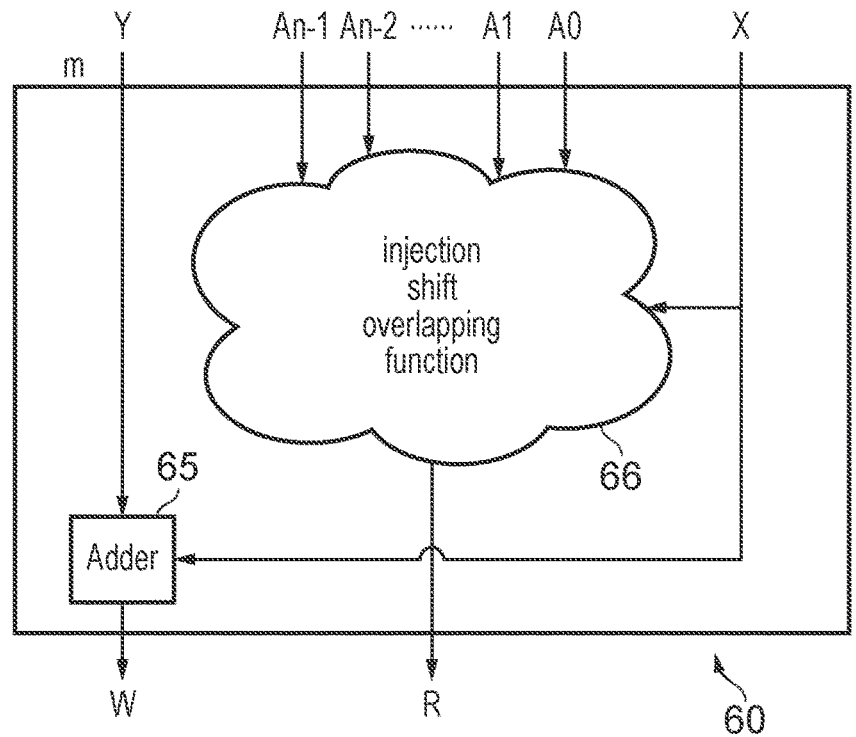
FIGS. 6A and 6B illustrate a module for use in generating an ordered list of non-excluded tag values in accordance with one embodiment.
Figure 6B:
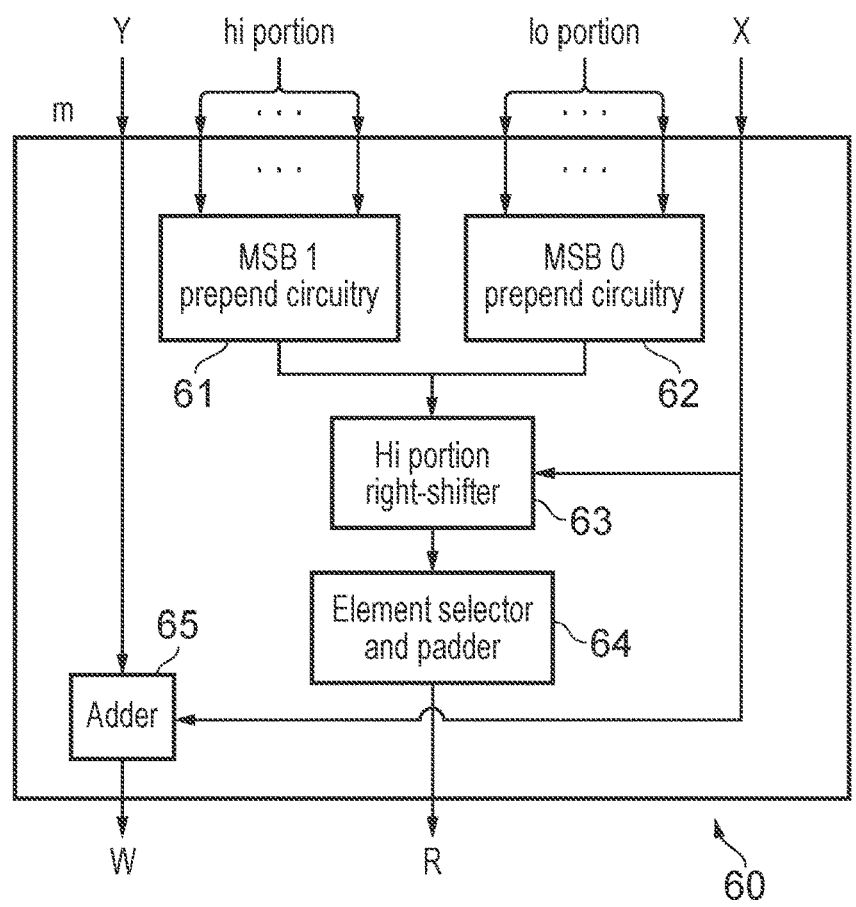
Figure 7:
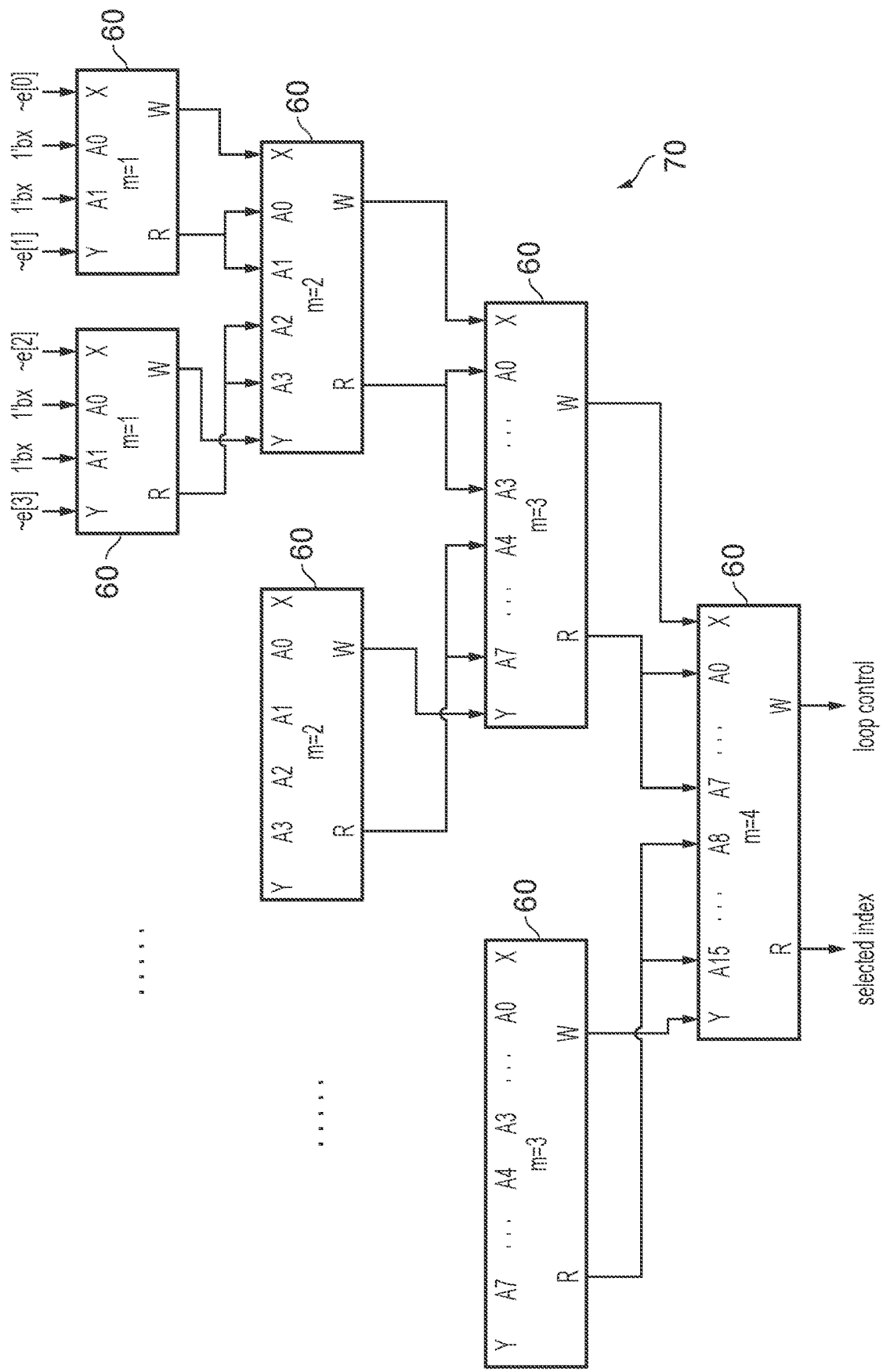
FIG. 7 illustrates a tree comprising a plurality of the modules of FIGS. 6A and 6B for use in generating an ordered list of non-excluded tag values in accordance with one embodiment.

FIGS. 6A and 6B illustrate a module 60 for use in generating an ordered list of non-excluded tag values. The module 60 operates in response to inputs X, Y and $A_0$ to $A_{n-1}$. The $A_0$ to $A_{n-1}$ inputs can be characterised into a low portion and a high portion as shown in FIG. 6B. The modules are arranged in a binary tree 70 as shown in FIG. 7 with each module 60 building up the ordered list of non-excluded tag values corresponding to portions of the excluded tag vector. For modules corresponding to nodes other than leaf nodes, the inputs $A_0$ to $A_{n-1}$ indicate the elements of the intermediate ordered lists received from modules forming child nodes, X indicates the number of non-excluded tag values in the intermediate ordered list corresponding to a low portion of the excluded tag vector and Y indicates the number of non-excluded tag values in the intermediate ordered list corresponding to a high portion of the excluded tag vector. For modules corresponding to leaf nodes, X indicates a low field of the excluded tag vector and Y indicates a high field of the excluded tag vector (in fact, as shown in FIG. 7, the low and high fields considered by a leaf node are individual bits of the excluded tag vector, and the inverted versions of those bits is input to the leaf nodes to account for the fact that a '0' in the excluded bit vector means available and a '1' means not available). The inputs $A_0$ and $A_1$ are unused for the leaf nodes according to this implementation but for consistency of operation between the modules 60, can be considered to each provide an input of zero bits in length.

Each module 60 is characterised by an order m which indicates the level in tree 70 of the modules 60. The number of inputs to each module 60 can also be determined from the order m since the number of inputs $A_0$ to $A_{n-1}$ is equal to $2^m$. As shown in FIG. 6A, the module 60 comprises injection shift overlapping function logic 66. The injection shift overlapping function logic 66 is arranged to operate in response to the inputs $A_0$ to $A_{n-1}$ and X and to generate an ordered list of non-excluded tag values corresponding to the combined portion of the excluded tag vector operated on by its child nodes. This ordered list is output as R to a parent module 60 via the inputs labelled as the high or low portion in FIG. 6B or as the resulting ordered list of non-excluded tag values for the root node. The module 60 is also provided with an adder 65 which returns as output W, the sum of X and Y, to give the number of non-excluded tag values in output R.

The injection shift overlapping function logic 66 of FIG. 6A is shown in more detail in FIG. 6B. As shown in FIG. 6B, the module 60 comprises circuitry 61, 62 to prepend, as a most significant bit, a 0 to each element of a low portion of the input $A_0$ to $A_{n-1}$ and a 1 to each element of a high portion of the input $A_0$ to $A_{n-1}$. The elements corresponding to the high portion are then right-shifted at the high portion right-shifter 63 by a number of elements given by the input X. The right-shifted elements corresponding to the high portion are then overlapped with the elements corresponding to the low portion in the element selector and padder 64 which is arranged to propagate all of the elements corresponding to the high portion, the elements corresponding to the low portion that do not overlap with the elements corresponding to the high portion, and to pad the remaining (most significant) elements of the output R to achieve the correct length.

FIG. 7 illustrates a tree 70 comprising a plurality of the modules 60 for use in generating an ordered list of non-excluded tag values. The tree 70 is implemented as a binary tree 70 and according to this embodiment the binary tree 70 is a complete binary tree with FIG. 7 omitting the depiction of all of the modules 60. At each level of the tree 70, the modules 60 have a different value of m. Thus the m value can be used to indicate the level of the tree 70 at which a module is located with modules forming leaf nodes having an m value of one, and the m value incremented by one at each subsequent level. Each module 60 receives an X and a Y input, inputs $A_0$ to $A_{n-1}$ where n equals $2^m$ with each input $A_0$ to $A_{n-1}$ considered to comprise m−1 bits. Each module 60 has an output R of size m×$2^m$ bits and an output W with a size of m+1 bits. As explained further with reference to the worked example of FIG. 10, the tree 70 is arranged to build up the ordered list of non-excluded tag values recursively with each module 60 operating on the intermediate results produced by its child nodes. Thus each module can operate in a similar way, making manufacture of the apparatus simpler and resulting in fast generation of the ordered list as the task of generating the ordered list of non-excluded tags can be broken down into increasingly smaller tasks to be performed and then combined.

FIG. 8 is a worked example illustrating the operation of an apparatus 28 for determining a selected tag value. The apparatus 28 is arranged to operate in response to an excluded tag vector labelled as "Exclude" comprising the bit vector 1010 0110, a start tag value 010 and an offset of 2. According to this worked example, the apparatus 28 is configured to operate in response to tag values of three bits in length, the excluded tag vector is a bit vector with an index equal to the tag value that that field represents, and a value of 0 in the excluded tag vector indicates that the tag value is available. This is illustrated in FIG. 8 by the arrow indicating that the start tag value 010 corresponds to field 2 of the excluded tag vector (where the counting starts from 0 at the right-hand side of the excluded tag vector as illustrated and 2 in decimal corresponds to 010 in binary). The apparatus 28 is configured to determine, as the selected tag value, the tag value offset from the start tag value by a number of non-excluded tag values equal to the offset. According to this implementation, this is expected to correspond to a tag value of 100 having an index of 4 since this is the second zero after the start tag value. According to other implementations a different counting system may be used, for example, where the first 0 in the excluded tag vector corresponds to the $0^{th}$ non-excluded tag vector rather than the first, and may result in a different expected selected tag value.

Ordered list generation circuitry 41 of the apparatus 28 is configured to produce an ordered list of non-excluded tag values padded with other values to achieve a predetermined length, labelled R in FIG. 8. The tag values in the list R correspond to the tag values indicated as non-excluded in the excluded tag vector. Thus the tag values of 110, 100, 011, and 000 are not excluded. R is padded as indicated by x . . . x. The particular values used for padding do not matter and so have been indicated by xs although these could all be of a fixed value or it may be that it is more desirable not to provide logic to set these to a fixed value, instead allowing the ordered list generation circuitry to continue operating according to its implementation for selecting the non-excluded tag values and disregarding the values that result. A W value is also produced which indicates the number of non-excluded tag values in the excluded tag vector, which in this case is four.

A looped vector of non-excluded tag values is next generated. Since there are eight possible offset values and eight possible start tag values, the looped R is generated with 16 elements, the sum of these two values. The looped R is generated by repeating the portion of R containing the non-excluded tag values as indicated by W. Thus the first four values of R are repeated until the looped R has 16 elements. The offset is then applied to the looped R to generate the looped selection of exclude. The looped selection of exclude starts with an element of the looped R given by the offset. In this case the offset is two and so the first element of the looped selection of exclude is the second element of the looped R. So in this example, the first element of the looped selection of exclude is 011. Since the offset has already been applied when generating the looped selection of exclude, the length of the looped selection of exclude is predetermined based on the maximum value of the start tag value. Here, the looped selection of exclude has eight elements.

While the list generation circuitry 41 generates the looped selection of exclude, count determination circuitry 42 is arranged to determine a count of the number of non-excluded start tags occurring in a region bounded by an initial field and a field corresponding to the start tag value. According to this implementation, the initial field is the first field in the excluded tag vector, corresponding to index 0 and tag value 000 and the region includes both the initial field and the field corresponding to the start tag value. Thus it is expected that the count will be equal to one since the excluded tag vector has one zero value in this region, at index 0.

The count determination circuitry 42 generates a mask indicating the position of the start tag value in the excluded tag value. The mask has eight bits, equal to the number of fields in the excluded tag vector, with a 0 for the bit corresponding to the start tag value, 1s for the bits occurring after the start tag value (where "after" refers to higher tag values) and 0s for bits occurring before the start tag value. Thus the mask is 1111 1000. The mask is ORed with the excluded tag vector although other implementations may make use of different logical operations between the excluded tag vector and the mask. Particularly, if the excluded tag vector is not a bit vector, a different logical operation may be required to enable the count determination circuitry 42 to determine the count. The result of the OR operation in this example is 1111 1110. To determine the count of the number of non-excluded tag values in the region, the number of zeros in this vector is counted, giving a count of 1.

Based on the results of the list generation circuitry 41 and count determination circuitry 42, tag selection circuitry 43 selects a selected tag value as the tag value in the looped selection of exclude at a position given by the count value. Since the count value is 1 in this example, the tag value 100 is selected. This is done using a counting into the looped selection of exclude that starts from zero. That is, the $0^{th}$ element of the looped selection of exclude would be 011 and the first is 100. Hence, 100 is determined to be the selected tag according to this example.

Figure 9:
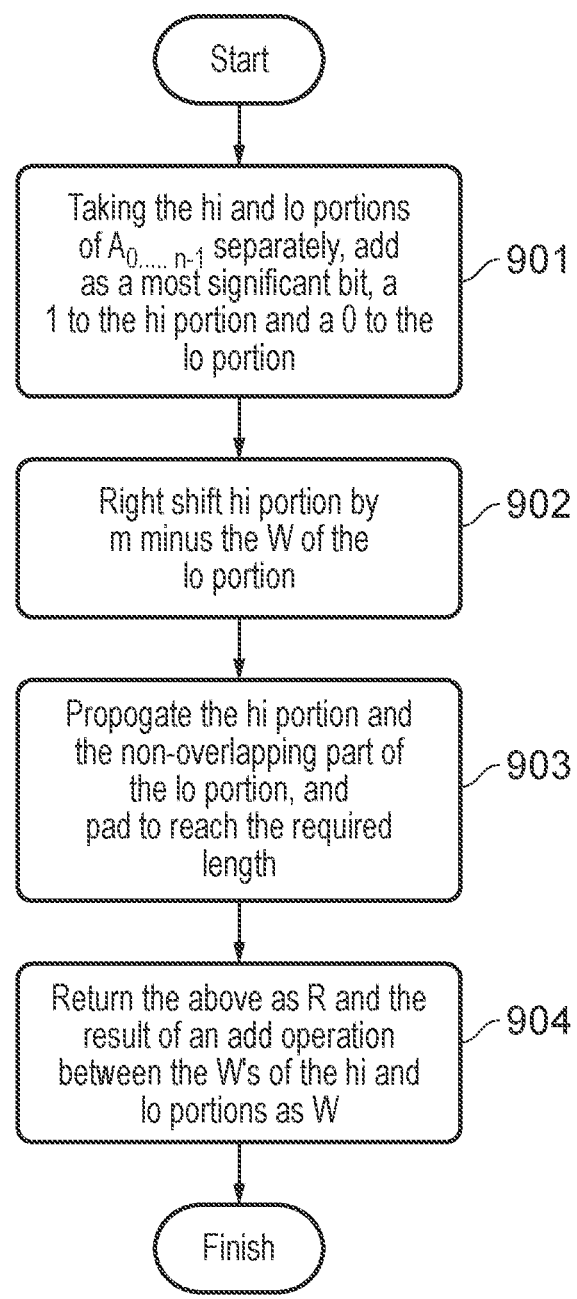
FIG. 9 is a flowchart illustrating the operation of a module of FIGS. 6A and 6B in accordance with one embodiment.

FIG. 9 is a flowchart illustrating the operation of a module 60 as depicted in FIGS. 6A and 6B. At step 901, the module 60 takes the high and low portions of the input $A_0$ to $A_{n-1}$ separately and adds as a most significant bit to the start of the elements of the high portion a 1, and to the start of the elements of the low portion a 0. As mentioned above, for modules forming leaf nodes, the inputs $A_0$ and $A_1$ can be considered as having zero bits in length. By doing this, it can be considered that by prepending a 0, the result is a single 0 bit, and by prepending a 1, the result is a single 1 bit. By performing step 901, the size and significance of the input portions of the excluded tag vector being operated on is accounted for, with the ordered list generation circuitry gradually building up the actual tag value being considered by virtue of this selective bit prepending.

At step 902, the high portion is right-shifted by a number of elements given by X, where X is the number of non-excluded tag values in the low portion when the module 60 is not a leaf node, and X is indicative of the less significant bit being operated on by the module 60 when the module 60 is a leaf node.

At step 903, the module 60 selects all of the elements of the right-shifted high portion and the non-overlapping part of the low portion to build the ordered list of non-excluded tag values, padding the result to reach the required length. Since the amount of overlap between the low portion and the right-shifted high portion is defined by the amount by which the high portion is right-shifted relative to the low portion, all of the non-excluded tag values in the low portion are propagated with the excluded tag values being discarded. Since all of the high portion is propagated, all of the non-excluded tag values in that portion are propagated and since all of the tag values were ordered at the input, the ordering is maintained. Therefore, the output comprises a resulting ordered list of non-excluded tag values.

At step 904, the resulting list from step 903 is returned as R, and W is output as the sum of the X and Y inputs, i.e. the number of non-excluded tag values in the combined portion of the excluded tag vector being considered. For modules 60 forming nodes other than the root node, the resulting outputs are provided as inputs to a parent node with the elements of R forming either the high portion or the low portion of the $A_0$ to $A_{n-1}$ input of the next modules and W forming either the X input or the Y input as shown in FIG. 7.

The operation of a module 60 is set out in the pseudocode below:

```
bits (m) Y;
for i = 0; i <= 2^m - 1; i++
begin
    bits (m - 1) Ai; // when m = 1, input Ai is actually 0-bit, which means it is empty and useless
    bits (m) Bi;
end
bits (m) X;
bits (m + 1) W;
bits (2^m * m) R;
bits (1) cout;
integer x = UINT(X);
for i = 0; i <= 2^ (m - 1) - 1; i++
begin
    Bi = {1'b0, Ai} // Remember that Ai is 0-bit when m = 1, so Bi = 1'b0 in this case
end
for i = 2^(m - 1); i <= 2^m - 1; i++
begin
    Bi = {1'b1, Ai} // Remember that Ai is 0-bit when m = 1, so Bi = 1'b1 in this case
end
assert x <= (2^(m - 1));
for i = 0; i <= x - 1; i++
begin
    R[i*m + m - 1:i*m] = Bi;
end
for i = x; i <= x + 2^(m - 1) - 1; i++
begin
    j = i - x + 2^(m - 1)
    R[i*m + m - 1:i*m] = Bj
end
for i = x + 2^(m - 1); i <= 2^m - 1; i++
begin
    R[i *m + m - 1:i*m] = 0
end
// W is mostly UINT(X) + UINT(Y) with imprecise logic for MSBs
{cout, W[m - 2:0]} = UINT(X[m - 2:0]) + UINT(Y[m - 2 :0]) ;
W[m - 1] = cout | X[m - 1] ^ Y[m - 1] ;
W[m] = X[m - 1] & Y[m - 1];
```

Figure 10:
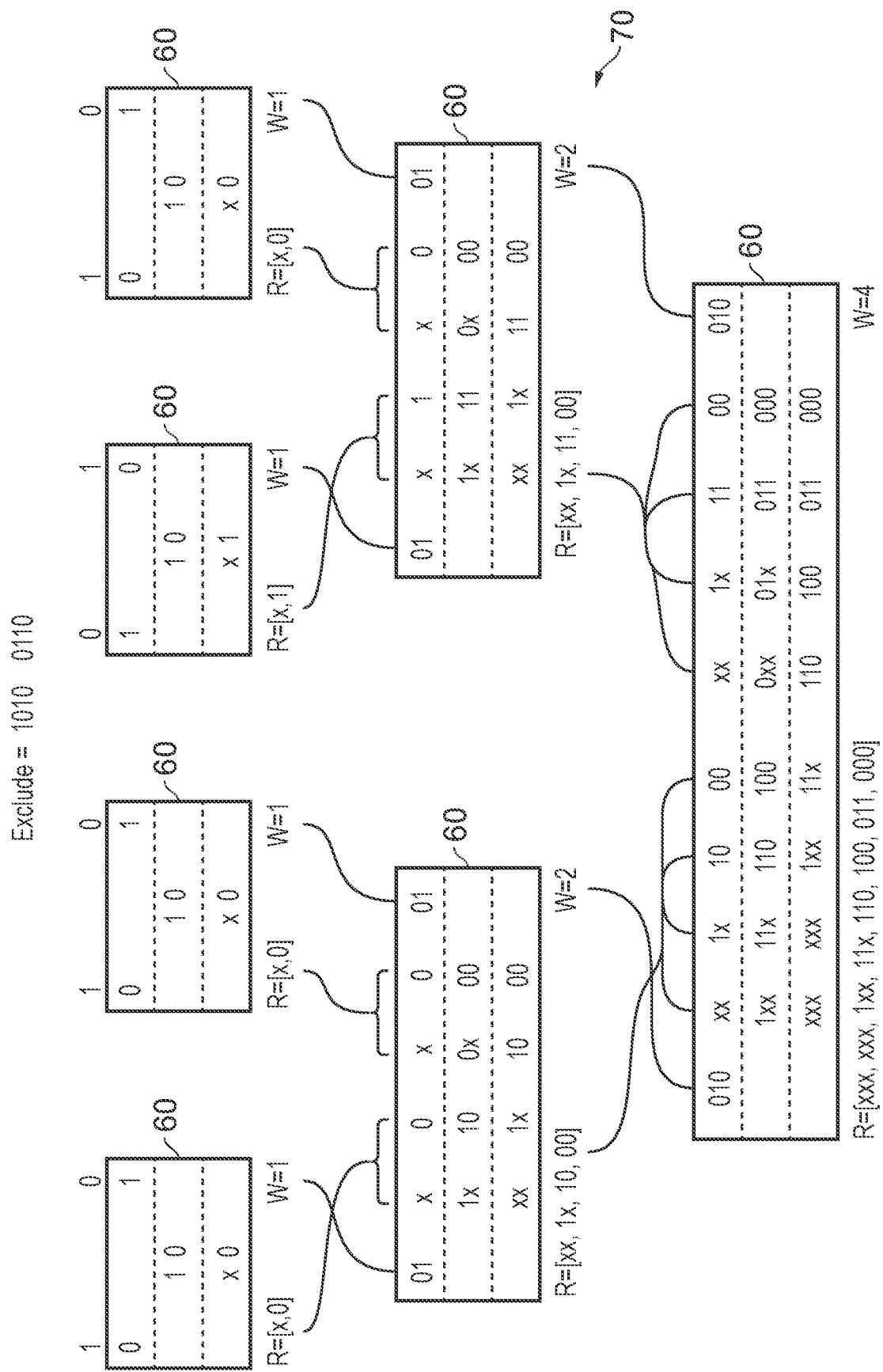
FIG. 10 is a worked example illustrating the operation of a tree comprising a plurality of the modules of FIGS. 6A and 6B for use generating an ordered list of non-excluded tag values in accordance with one embodiment.

FIG. 10 is a worked example illustrating the operation of a tree 70 comprising a plurality of the modules 60 of FIGS. 6A and 6B. In this example, the ordered list generation circuitry receives the excluded tag vector 1010 0110 and using the tree 70 of modules 60, produces an ordered list of non-excluded tag values and a count of the number of non-excluded tag values. As in implementations presented above, the excluded tag vector is a bit vector for which a value of 0 indicates that a tag value is available, a value of 1 indicates that tag value is excluded, and the index in the bit vector is indicative of the tag value to which each bit relates.

Each leaf node, illustrated at the top of FIG. 10, operates on two bits of the excluded tag vector. As discussed above, the leaf nodes can be considered to have as inputs X and Y values, as well as the inputs $A_0$ and $A_1$ which are of length zero bits. The X input for each leaf node is the result of a bitwise NOT operation on the bit that corresponds to the less significant bit on which that module 60 operates, and the Y input is the result of a NOT operation on the bit that corresponds to the more significant bit. The inputs X and Y are illustrated on the top line of each module 60 with $A_0$ and $A_1$ not depicted as they are considered to have a length of 0 bits, and so in practice the leaf modules are not provided with such inputs, but can be considered for consistency with the other nodes.

For the module 60 at the top left of FIG. 10, input X is equal to 1 and input Y is equal to 0 as the most significant bits of the excluded tag vector are 1 and 0.

Next, a 1 is prepended to the high portion of the $A_0 \ldots A_{n-1}$ inputs. For the leaf nodes this corresponds to $A_1$, and a 0 is prepended to the low portion, corresponding to $A_0$. Since $A_1$ and $A_0$ are considered to have a length of zero, the result is a 1 and a 0 as shown in the middle line of the modules 60 in the top row of FIG. 10.

The resulting high portion is then right-shifted by a number of elements given by X. For the leaf node at the top left of figure, in the middle line, the 1 value is thus right-shifted by one (not shown). The high and low portions are overlapped to produce in the final line 1 0. Since the apparatus 28 is only concerned with the elements that relate to non-excluded tag values, the 1 is represented by x to indicate that this value will not be used.

The output of the modules 60 forming the leaf nodes therefore indicates if there are any non-excluded tag values relating to the relevant portion of the excluded tag vector. The leaf nodes also output an indication of the number of non-excluded tag values in the region of the excluded tag vector on which they operated. In this example, for each of the modules forming leaf nodes, the count of non-excluded tag values is one.

In the middle row of FIG. 10 is depicted the parent nodes of the leaf nodes. Each of these nodes is arranged to receive the output of its two child nodes. The counts of non-excluded tag values become the inputs X and Y, and the elements of lists R become the inputs $A_0$ to $A_3$ as illustrated. The first line of each of the modules 60 in the middle row shows these inputs.

At the middle line of each of these modules 60 is shown the result of prepending a 1 to the elements of the high portion, $A_2$ to $A_3$, and a 0 to the elements of the low portion, $A_0$ to $A_1$.

The high portion is then right-shifted by X, overlapped with the low portion, and the appropriate elements propagated as explained above. Thus for the module 60 forming the node at the left of the middle row in FIG. 10, the list 1x 10 is right-shifted by one and overlapped with 0x 00. The non-overlapping part of the low portion is 00 due to the right-shift by one and so this element is propagated. The high portion is propagated and the remaining space is padded with xx to produce xx 1x 10 00 which is output as R. W is determined to be 2 as the sum of the X and Y inputs. These outputs are then passed to the root node as shown in FIG. 10.

The root node is shown at the bottom of FIG. 10. The root node receives inputs X and Y as the outputs W of its two child nodes. The root node also receives as inputs $A_0$ to $A_7$ the outputs R of its two child nodes, one child node providing the high portion and the other providing the low portion. These inputs are shown in the top line of the root node.

At the second line of the root node is shown the result of prepending a 0 to the elements of the low portion of $A_0$ to $A_7$ and a 1 to the high portion of $A_0$ to $A_7$.

The high portion is then right-shifted by two elements, since the value of X for this module is two, and overlapped with the low portion. Propagating the low portion that does not overlap gives 011 000, propagating the high portion gives 1xx 11x 110 100. R is then padded with xxx xxx to reach the length of eight elements. As such the resulting value of R to output is xxx xxx 1xx 11x 110 100 011 000 where x may be any value and is represented by x as its value is known not to be relevant. W is determined to be 4 as the result of adding X and Y inputs. This indicates that there are four non-excluded tag values in the resulting ordered list of non-excluded tag values allowing circuitry to select between the non-excluded tag values and the other values that may be present in R that do not represent the ordered list.

It is seen that, by adopting the above described approach, an ordered list of non-excluded tag value is built up to be used by the tag selection circuitry 43 to select a new tag value for use in a tag-guarded memory.

It will be appreciated that the above-described techniques provide an efficient and effective mechanism for selecting a tag value for use in a tag-guarded memory. In particular, the described techniques can account for an indication of tags that are to be excluded from use and apply an identified offset to deterministically select a tag value following an indicated start tag value. This can be implemented in a tag-guarded memory to improve to memory security, protecting against memory-related errors while reducing the performance impact associated with having to select new tags for use.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus for determining, for use in a tag-guarded memory, a selected tag value from a plurality of tag values, comprising:

ordered list generation circuitry to receive an excluded tag vector comprising a plurality of fields, where each field is associated with a tag value in said plurality of tag values and identifies whether the associated tag value is excluded from use, the ordered list generation circuitry being arranged to generate, from said excluded tag vector, an ordered list of non-excluded tag values;

count determination circuitry to determine, using said excluded tag vector and an identified start tag value, a count value indicative of a number of non-excluded tag values occurring in a region of the excluded tag vector bounded by an initial field and a field corresponding to said start tag value; and tag selection circuitry to determine the selected tag value from said ordered list based on said count value and an identified offset, the identified offset indicating a required number of non-excluded tag values between said start tag value and said selected tag value;

wherein the apparatus is arranged to associate the selected tag value with an address identifying an addressed location in a memory system; and the apparatus further comprises memory access circuitry responsive to a tag-guarded memory access operation based on a target address identifying a particular addressed location in the memory system to:

compare an address tag associated with the target address with a guard tag associated with a block of one or more memory locations that includes the particular addressed location identified by the target address; and generate an indication of whether a match is detected between the guard tag and the address tag.

2. The apparatus according to claim 1, wherein:
the region of the excluded tag vector bounded by an initial field and a field corresponding to said start tag value includes the field corresponding to said start tag value.

3. The apparatus according to claim 1, wherein:
the ordered list generation circuitry is arranged to determine, from the excluded tag vector, an ordered sequence of non-excluded tag values, and to generate the ordered list as a looped list of non-excluded tag values comprising P elements, such that when the ordered sequence of non-excluded tag values has fewer than P elements the looped list is completed by adding at least a repeated portion of the ordered sequence of non-excluded tag values.

4. The apparatus according to claim 3, wherein:
P is equal to the sum of a maximum start tag value and a maximum offset.

5. The apparatus according to claim 3, wherein:
the ordered list generation circuitry is arranged to produce a modified ordered list by selectively reducing the number of elements in the ordered list based on the offset, and the tag selection circuitry is arranged to determine as the selected tag value, the tag value at a position in the modified ordered list determined by the count value.

6. The apparatus according to claim 1, wherein:
the excluded tag vector is a bit vector such that each field comprises a single bit, and the index of each bit in the bit vector is used by the ordered list generation circuitry to determine the tag value to which that bit relates.

7. The apparatus according to claim 1, wherein:
the count determination circuitry is arranged to:
generate a mask to indicate the field in the excluded tag vector corresponding to the start tag value;
perform a logical operation on the mask and the excluded tag vector to produce a masked excluded tag vector; and
determine the count value from the number of fields in the masked excluded tag vector having a predetermined value.

8. The apparatus according to claim 7, wherein:
the logical operation is a logical OR operation.

9. The apparatus of claim 7, wherein:
the count determination circuitry is arranged to determine the count value by performing a carry-save adder reduction using the mask and the excluded tag vector.

10. The apparatus according to claim 1, wherein:
the ordered list generation circuitry comprises a plurality of modules arranged to form nodes of a binary tree that operate in combination to build up the ordered list of non-excluded tags recursively, such that each node other than a leaf node is arranged to operate on intermediate results produced by connected child nodes for corresponding portions of the excluded tag vector.

11. The apparatus according to claim 10, wherein:
each of said plurality of modules forming a node other than a leaf node is arranged to:
receive from a first child node a high intermediate ordered list of non-excluded tag values corresponding to a high portion of the excluded tag vector and receive from a second child node a low intermediate ordered list of non-excluded tag values corresponding to a low portion of the excluded tag vector, where the high portion corresponds to a more significant part of the excluded tag vector than the low portion;
receive, for each of the intermediate ordered lists, a count of a number of non-excluded tag values in the intermediate ordered list;
output an ordered list of non-excluded tag values corresponding to the combination of said high and low portions of the excluded tag vector; and
output a count of non-excluded tag values in said combination of said high and low portions of the excluded tag vector.

12. The apparatus according to claim 11, wherein:
to output the ordered list of non-excluded tag values corresponding to the combination of said high and low portions of the excluded tag vector, each module of said plurality of modules forming a node other than a leaf node is arranged to:
adjust the values of the elements of the high intermediate ordered list and the low intermediate ordered list to account for a size of the portion of the excluded tag vector being processed by that module;
right-shift the adjusted high intermediate ordered list based on the count of a number of non-excluded tag values in the low intermediate ordered list; and
propagate the right shifted adjusted high intermediate ordered list and any part of the adjusted low intermediate ordered list non-overlapping with the right shifted portion of the adjusted high intermediate ordered list to form the ordered list of non-excluded tag values corresponding to the combination of said high and low portions of the excluded tag vector.

13. The apparatus according to claim 10, wherein:
each of said plurality of modules forming a leaf node is arranged to:
receive an indication of a high field of an associated portion of the excluded tag vector;
receive an indication of a low field of the associated portion of the excluded tag vector, where the high field corresponds to a more significant part of the excluded tag vector than the low field;
output an intermediate ordered list of non-excluded tag values corresponding to a combination of said high and low fields of the excluded tag vector; and
output a count of non-excluded tag values corresponding to the combination of said high and low fields of the excluded tag vector.

14. The apparatus according to claim 1, wherein:
the apparatus is arranged to operate in response to an instruction identifying the start tag value and the offset.

15. The apparatus according to claim 14, wherein:
the instruction specifies a manipulation to perform on an identified address value and the apparatus is arranged to determine the selected tag value in a same number of clock cycles taken to perform the manipulation on the identified address value.

16. The apparatus according to claim 1, wherein:

the apparatus is arranged to receive the excluded tag vector from a control register.

17. A method for determining, for use in a tag-guarded memory, a selected tag value from a plurality of tag values, the method comprising:
- receiving an excluded tag vector comprising a plurality of fields, where each field is associated with a tag value in said plurality of tag values and identifies whether the associated tag value is excluded from use;
- employing ordered list generation circuitry to generate, from said excluded tag vector, an ordered list of non-excluded tag values;
- employing count determination circuitry to determine, using said excluded tag vector and an identified start tag value, a count value indicative of a number of non-excluded tag values occurring in a region of the excluded tag vector bounded by an initial field and a field corresponding to said start tag value;
- determining the selected tag value from said ordered list based on said count value and an identified offset, the identified offset indicating a required number of non-excluded tag values between said start tag value and said selected tag value;
- associating the selected tag value with an address identifying an addressed location in a memory system; and
- in response to a tag-guarded memory access operation based on a target address identifying a particular addressed location in the memory system:
  - comparing an address tag associated with the target address with a guard tag associated with a block of one or more memory locations that includes the particular addressed location identified by the target address, and
  - generating an indication of whether a match is detected between the guard tag and the address tag.

18. An apparatus for determining, for use in a tag-guarded memory, a selected tag value from a plurality of tag values, comprising:
- ordered list generation means for receiving an excluded tag vector comprising a plurality of fields, where each field is associated with a tag value in said plurality of tag values and identifies whether the associated tag value is excluded from use, the ordered list generation means for generating, from said excluded tag vector, an ordered list of non-excluded tag values;
- count determination means for determining, using said excluded tag vector and an identified start tag value, a count value indicative of a number of non-excluded tag values occurring in a region of the excluded tag vector bounded by an initial field and a field corresponding to said start tag value; and
- tag selection means for determining the selected tag value from said ordered list based on said count value and an identified offset, the identified offset indicating a required number of non-excluded tag values between said start tag value and said selected tag value;
- wherein the apparatus is arranged to associate the selected tag value with an address identifying an addressed location in a memory system; and
- the apparatus further comprises means for accessing memory responsive to a tag-guarded memory access operation based on a target address identifying a particular addressed location in the memory system to:
  - compare an address tag associated with the target address with a guard tag associated with a block of one or more memory locations that includes the particular addressed location identified by the target address; and
  - generate an indication of whether a match is detected between the guard tag and the address tag.

* * * * *